Feb. 9, 1965   G. R. HURLBURT   3,168,814
AUTOMATIC WATER CONTROL GATE
Filed Sept. 14, 1961   3 Sheets-Sheet 1

INVENTOR
GEORGE R. HURLBURT
BY
Ernest S. Cohen
Gersten Sadowsky
ATTORNEYS

United States Patent Office

3,168,814
Patented Feb. 9, 1965

3,168,814
AUTOMATIC WATER CONTROL GATE
George R. Hurlburt, Farmington, N. Mex., assignor to the United States of America as represented by the Secretary of the Interior
Filed Sept. 14, 1961, Ser. No. 138,027
2 Claims. (Cl. 61—25)

The present invention relates to control of water elevation in bodies of water such as reservoirs and irrigation channels.

An object of the invention is to provide an automatic flow control gate which utilizes the pressure of the upstream water supply to cause a lifting force on the gate to allow excess water to escape, and to maintain a substantially uniform upstream water elevation in the event of widely fluctuating flow in the upstream channel.

A further object of the present invention is to provide a flow control gate, for installation in an irrigation system, which is fully automatic in operation; one simple in structure; one sturdily constructed; and one which is economically feasible.

These and other objects and advantages of the present invention will be fully apparent from the following description, when taken in conjunction with the annexed drawings in which.

Referring in greater detail to the drawings in which like numerals indicate like parts throughout the several views, in FIGURES 1 to 8, the gate is shown in an irrigation channel of which the floor is indicated by the number 12 and the spaced walls 14 rising from the floor.

Figure 2:
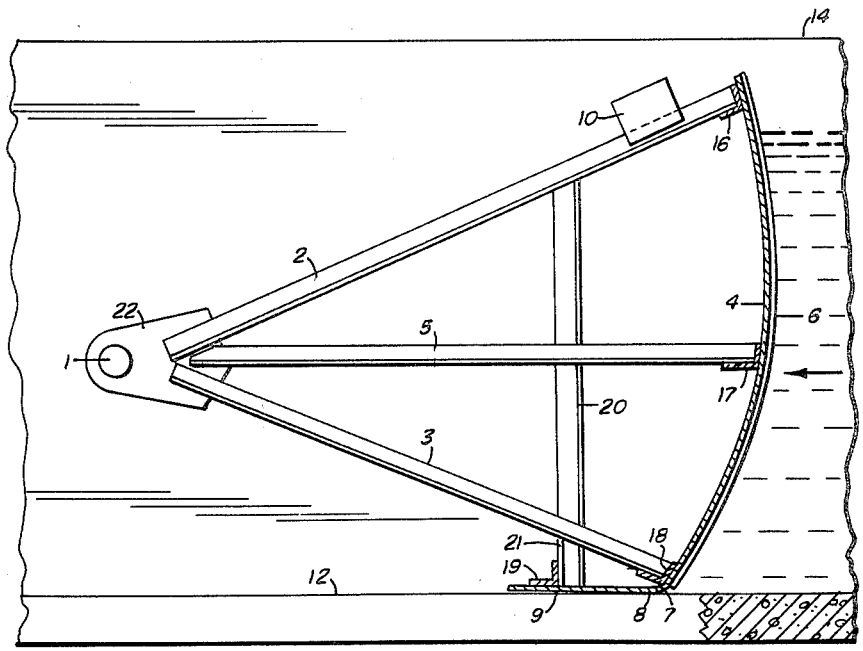
FIGURE 2 is a sectional side view of the gate, showing the structural members and position in an irrigation channel.

The gate of the present invention is indicated by the numbers as shown of its component parts, and is shown in FIGURE 2 to have a wide convexly arcuate upstream face 4, a small arcuately curved face 7, and plane downstream face 9.

The upstream surface of the face 4 is in communication with a body of water W in which the flow is subject to fluctuation.

Figure 5:
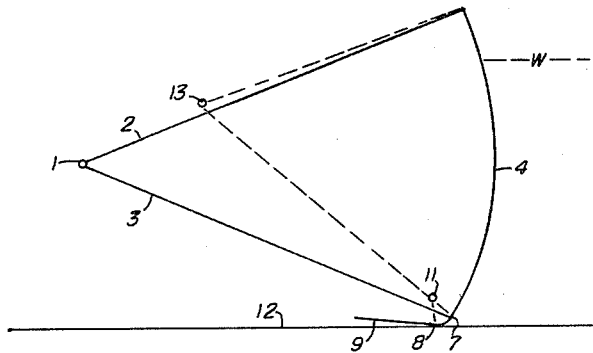
FIGURE 5 is a diagrammatic sectional side view showing the design of the gate surfaces and position in relation to the floor of an irrigation channel.

The center of radius 13 for the arcuate upstream face 4, as shown in FIGURE 5, is positioned above the pivot pin 1 and, since all upstream water pressure would be directed from the face 4 toward the center of radius 13, this said pressure would cause an opening force on the gate.

Likewise, the water pressure against the small arcuate face 7 is directed toward its center of radius 11, giving additional opening force to the gate.

A forward portion 8 of the downstream face 9 rests upon the floor 12 of the channel, as shown in FIGURE 5.

The gate of the present invention is attached to the spaced walls 14 of the channel by means of pivot pins 1 which project horizontally from the walls 14, vertically disposed plates 22, designed to rotate on pivot pins 1, and arms 2, 5 and 3 attached to the plates 22 and projecting forwardly to horizontally disposed angle iron members 16, 17 and 18 respectively, thus forming the supports for the face 4 as shown in FIGURE 2. This provides means for a swinging movement of the gate about a horizontal axis 1 from a position in which the portion 8 of the downstream face 9 rests upon the floor 12 to a position in which the face 9 is spaced above the floor 12.

The vertically disposed members 20 are supports for the arms 2, 3 and 5, as shown in FIGURE 2. Likewise, the vertical members 21, attached to arms 3 and to horizontally disposed member 19, form a support for downstream face 9.

The details of the structural parts of the gate are similar to those of many other radial type gates and are not claimed as new.

An open top elongated box 10 rests upon and is adjustably secured to the arm members 2 adjacent and rearwardly of the face 4. The purpose of this box 10 is to provide ballast to control the elevation at which the gate would start its opening movement. The manner of clamping and adjusting the box 10 on the arms 2 is variable according to gate size and is not considered as part of the invention.

Figure 1:
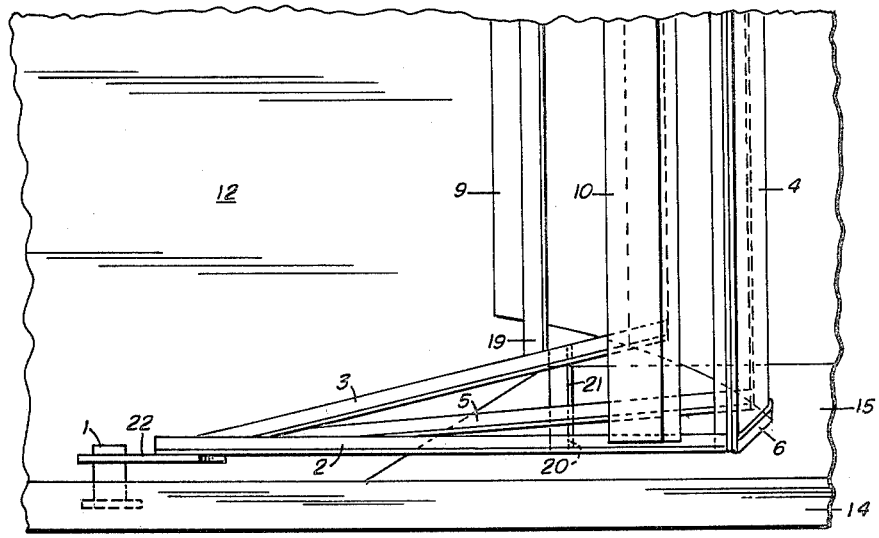
FIGURE 1 is a one-half plan view of the symmetrical gate of the present invention shown installed in an irrigation channel.
Figure 3:
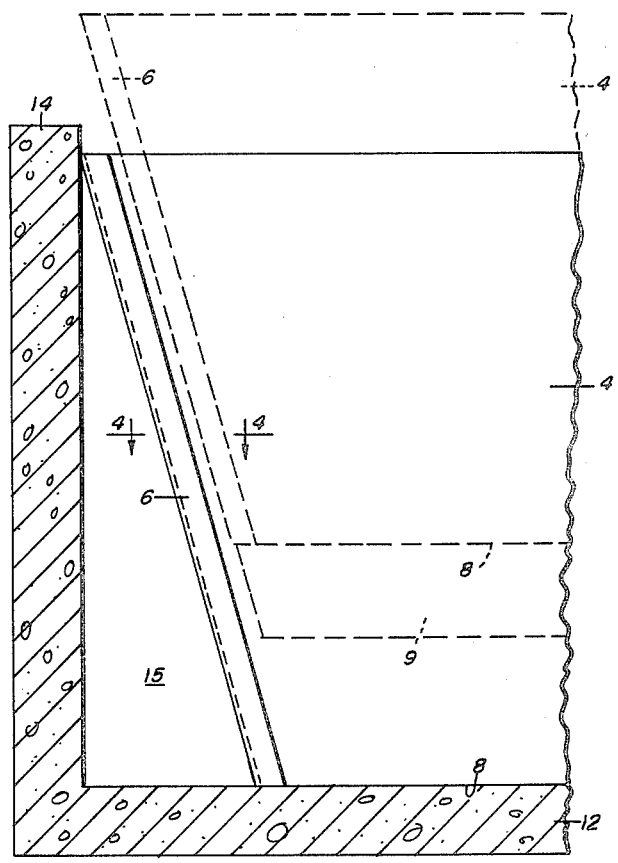
FIGURE 3 is an elevational view as seen from the front, showing one-half of the symmetrical gate in a closed and a partially open position.
Figure 4:
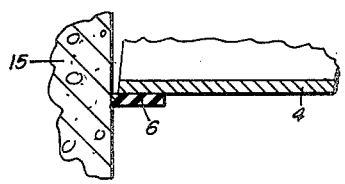
FIGURE 4 is a fragmentary plan view, on an enlarged scale, taken on the line 4—4 of FIGURE 3.

A further feature of the present invention is the battered or sloping sections 15 of the walls 14 as shown in FIGURES 1 and 3. The face 4 is so constructed as to conform with the battered walls 15 when the gate is in a closed position as shown in FIGURE 3. FIGURE 4 is a fragmentary plan view showing a resilient strip 6 attached to the upstream surface of face 4 and in communication with the battered wall 15. This forms an effective seal when the gate is in a closed position. When the gate is in the act of opening, the resilient strip 6 diverges from the battered wall 15 as shown by the dashed lines in FIGURE 3. This frees the gate of any frictional drag which might impede free movement of the gate.

Figure 6:
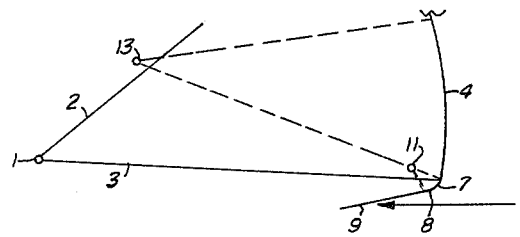
FIGURES 6, 7 and 8 are fragmentary sectional side views, showing the lower portion of the gate in progressively open positions.
Figure 7:
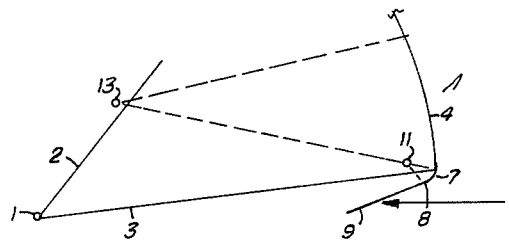
Figure 8:
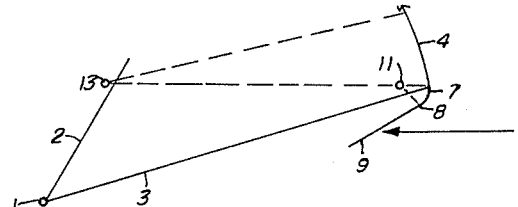

Under the conditions when the water pressure against the upstream surface of the face 4 and the small arcuately curved face 7 is such that an opening action of the gate is initiated the plane downstream face 9 will move from a position adjacent to the floor 12, as seen in FIGURE 5, to address itself against the water at a progressively increasing angle, as shown in FIGURES 6, 7 and 8, thus utilizing the energy of the upwardly rushing water to continue the lifting action of the gate without a substantial increase in the upstream water elevation.

The combination of arms 2, 5 and 3, upstream faces 4 and 7, downstream plane face 9, and point 8 resting on the floor 12 when the gate is in a closed position, the positioning of the pivot pins 1, and the moveable ballast box 10, all properly proportioned for efficient operation of the present invention.

The feature of the present invention by which the water pressure against the arcuately curved faces 4 and 7 exerts a lifting force on the gate to initiate the opening action is not claimed as new. However the combination of this feature with the continued lifting action created by the action of the plane downstream face 9 is claimed as new. The function of the downstream face 9 is to add lifting force to the gate to compensate for the decreased lifting force against the upstream faces 4 and 7 as they move toward the water surface during the opening movement of the gate. The net result of this action is to maintain a substantially uniform upstream water elevation at periods of variation in flow of the upstream channel.

What is claimed is:

1. A hydraulic gate structure automatically operable on a channel having a floor and spaced walls rising from said floor, to control the flow through said channel from a body of water subject to fluctuations in flow, and maintain said water at a predetermined level, said gate comprising a bulkhead structure composed of a plurality of variously curved areas uniformly joined one to the other and convexly disposed against the upstream body of water, forming a continuously curved surface adapted to provide a barrier in the path of the flow from said body of water, a pivot means secured in said spaced walls downstream from said body of water, means supporting said bulkhead structure for angular displacements about the axis of said pivot means, and comprising bearing elements rotatably mounted on said pivot means, and radial extensions joining the said bulkhead structure to the bearing elements, said bulkhead structure being displaceable from a rest position wherein it substantially fully restrains the flow of said body of water, to activated positions wherein changes of the flow through said channel are obtained, said bulkhead structure at rest position placing a first center of curvature of a first of said curved areas above the axis of said pivot means and between the latter and the said bulkhead structure, a second center of curvature of a second of said curved areas between the said first center of curvature and said bulkhead structure, and below the axis of said pivot means, and situating a third plane area prolonging said bulkhead structure beyond said continuously curved surface, to locate a portion thereof to contact the said floor of the channel and extend a plane portion thereof rearwardly and upwardly downstream from the lower end of said curved surface, whereby said areas are adapted to receive upon a predetermined increase in the flow of said body of water raising the level thereof in the channel, increased upward pressure components which act to displace said bulkhead structure upwardly to expose thereby said plane portion of the third area to said upward pressure components of said body of water.

2. The hydraulic gate structure of claim 1 wherein a ballast box is adjustably fixed in position on said radial extensions joining the said bulkhead structure to the bearing elements, whereby the selective positioning of said ballast box provides a variable resistance to the upward displacement of said bulkhead structure to predetermine thereby the level to be maintained in said body of water.

References Cited by the Examiner
UNITED STATES PATENTS

| | | | |
|---|---|---|---|
| 843,003 | 2/07 | Davis | 61—25 |
| 952,725 | 3/10 | Buchler | 61—25 |
| 2,168,117 | 8/39 | Danel | 61—25 |

FOREIGN PATENTS 107,554  11/24  Switzerland.

EARL J. WITMER, *Primary Examiner.*
JACOB L. NACKENOFF, *Examiner.*